United States Patent
Oh et al.

(10) Patent No.: US 9,939,165 B2
(45) Date of Patent: Apr. 10, 2018

(54) WIRELESS THERMOSTAT WITH DUAL STAGE FAILSAFE CIRCUITS

(71) Applicant: Honeywell International Inc., Morristown, NJ (US)

(72) Inventors: Eric Oh, Syosset, NY (US); Steven Amodeo, Northport, NJ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 808 days.

(21) Appl. No.: 14/289,863

(22) Filed: May 29, 2014

(65) Prior Publication Data

US 2015/0345818 A1   Dec. 3, 2015

(51) Int. Cl.

| F24F 11/053 | (2006.01) |
|---|---|
| G05D 23/12 | (2006.01) |
| G05D 23/185 | (2006.01) |
| F24F 11/00 | (2018.01) |
| G05D 23/19 | (2006.01) |
| G05D 23/275 | (2006.01) |

(52) U.S. Cl.
CPC ........ *F24F 11/0012* (2013.01); *F24F 11/006* (2013.01); *G05D 23/1905* (2013.01); *G05D 23/1928* (2013.01); *G05D 23/2754* (2013.01); *F24F 2011/0052* (2013.01); *F24F 2011/0068* (2013.01)

(58) Field of Classification Search
CPC ............... F24F 11/0012; F24F 11/006; F24F 2011/0068; F24F 2011/0052; G05D 23/2754; G05D 23/1928; G05D 23/1905
See application file for complete search history.

(56) References Cited

U.S. PATENT DOCUMENTS

| 4,078,720 | A | * | 3/1978 | Nurnberg | G05D 23/275 165/202 |
|---|---|---|---|---|---|
| 4,298,946 | A | | 11/1981 | Hartsell et al. | |
| 5,238,184 | A | * | 8/1993 | Adams | G05D 23/1905 236/46 R |
| 5,957,374 | A | | 9/1999 | Bias et al. | |
| 2010/0006660 | A1 | * | 1/2010 | Leen | G05D 23/1931 236/51 |
| 2012/0179300 | A1 | * | 7/2012 | Warren | F24F 11/0012 700/278 |
| 2012/0267089 | A1 | * | 10/2012 | Mucignat | G05D 23/1905 165/201 |
| 2013/0140016 | A1 | | 6/2013 | Storm et al. | |
| 2014/0000858 | A1 | | 1/2014 | Frank | |

OTHER PUBLICATIONS

Extended European search report from corresponding EP patent application 15166087.5, dated May 2, 2016.

\* cited by examiner

*Primary Examiner* — Larry Furdge

(74) *Attorney, Agent, or Firm* — Husch Blackwell LLP

(57) ABSTRACT

A multi-mode thermostat includes a sensor of ambient temperature and control circuits coupled to the sensor, wherein the control circuits are responsive to signals from the sensor to maintain a predetermined regional temperature. First electrically actuated backup circuits are responsive to a firt sensed operational power level to alter a status signal transmission rate by the control circuits. Second electrically actuated backup circuits are responsive to a lower sensed operational power level to provide a backup, lower regional temperature electromechanically.

19 Claims, 1 Drawing Sheet

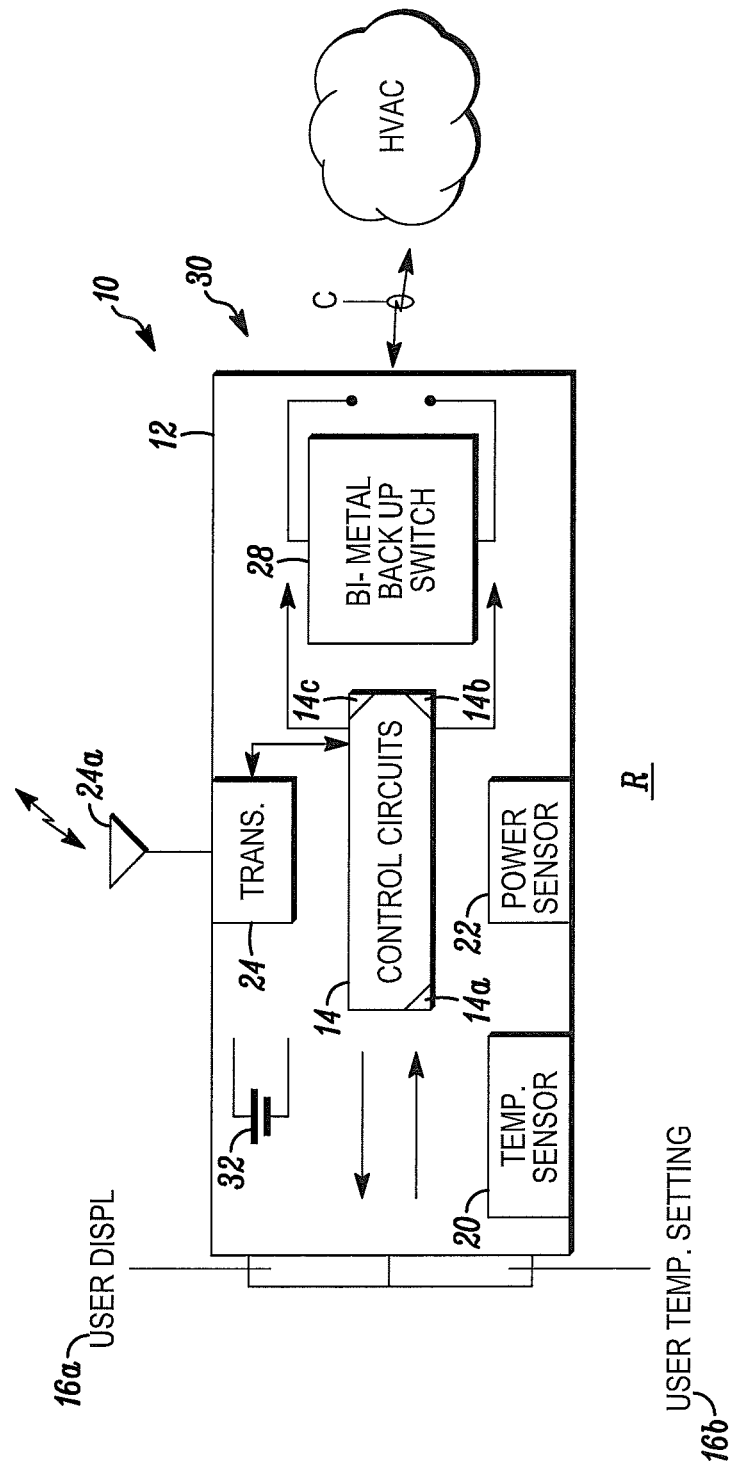

WIRELESS THERMOSTAT WITH DUAL STAGE FAILSAFE CIRCUITS

FIELD

The application pertains to thermostats. More particularly, the application pertains to wireless thermostats with multi-stage backup circuitry to provide failsafe operation.

BACKGROUND

Electronic thermostats have many features including energy saving operations and wireless communications for remote access. Typically, these electronic thermostats use 24 VAC or battery power to operate.

Thermostats with wireless RF communications can draw quite a bit of power, and when power is lost, the primary function of temperature control fails. During winter months, a home without heat for an extended period of time can lead to freezing water pipes that eventually burst, costing expensive repairs and loss of valuables.

For 24 VAC power type thermostats with rechargeable battery backups, there is still a chance that a battery will have drained after some period of lost AC. There is no failsafe mechanism to keep gas heat running. For battery power, the same problem can occur if a homeowner forgets to periodically replace current batteries with a fresh set, and there is no failsafe mechanism to keep a house temperature within normal limits.

BRIEF DESCRIPTION OF THE DRAWINGS

FIG. 1 is a block diagram of a thermostat in accordance herewith.

DETAILED DESCRIPTION

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

In embodiments hereof, multiple, low cost, fail safe mechanisms built into an electronic RF communicating thermostat provide more than one level of backup. First level backup circuitry reduces RF communication when a low power condition is detected, for example, a failure of 24 VAC input voltage or a detected drop in battery backup voltage level below safe operational levels.

The thermostat will only use minimum power to maintain temperature control and cuts RF communication to only sending out a low power status message once a day. It will not send any other communication message nor will it receive any incoming messages.

RF communication can be implemented with any form of radio frequency communication or technologies, such as Wi-Fi, Z-Wave, ZigBee, one-way RF communication, or bi-directional RF communication.

Second level backup circuitry includes a mechanical bimetallic thermal switch for providing minimum heating operation in case of a complete loss of power. This is especially useful for 24 VAC powered thermostats with no battery backup. This type of thermostat will lose temperature control immediately after AC is lost.

When thermostat electronics shut down after the thermostat's power is completely gone, the mechanical bimetallic thermal switch will take over to provide basic heating control and maintain heat in a house or monitored region above freezing level. The bimetallic thermal switch does not require any power to provide an open and close circuit function at a preset temperature setting. This provides a dual stage failsafe design to extend the operation of the thermostat and protects the house with gas heat from an installed regional heating system or an emergency gas heating system. Also, it minimizes risk of an electronic failure in the thermostat.

FIG. 1 illustrates a block diagram of a thermostat 10 that includes multi-mode backup circuitry and is an exemplary embodiment hereof. The thermostat 10 includes a housing 12 that carries control circuits 14. The circuits 14 can be implemented, at least in part, by a programmed processor 14a and associated, executable instructions 14b. One or more heating/cooling control switches 14c are also coupled to the control circuits 14, as discussed subsequently.

The housing 12 also carries a user display 16a and a manually operable temperature setting element 16b. The housing 12 also carries a regional temperature sensor 20 and an AC and/or DC power or voltage sensor 22.

The control circuits are also coupled to a wireless transceiver 24 and an antenna 24a. It will be understood that neither the exact type of wireless transmission nor the type of modulation thereof are limitations hereof.

The control circuits 14 carry out a regional temperature regulation function, based on signals from the temperature sensor 20, via the control switches 14c and an output port 30 that can be coupled via a cable C to a local regional heating/cooling HVAC system. Such couplings would be known to those of skill in the art and need not be discussed further.

The control circuits 14, responsive to a power level sensing signal from the sensor 22, can also carry out an initial backup operation in response to available power dropping below a first predetermined threshold. In response to a detected power drop due to an electrical failure or due to a voltage drop at a local battery 32, energy using functions of the control circuits 14 can be reduced or eliminated temporarily. For example, instead of routinely transmitting status signals or other messages via the transceiver 24 on a periodic basis, such as hourly, such messages can be temporarily transmitted with much longer intervals, such as daily, between transmissions to conserve energy.

While in the above described initial backup mode, the control circuits 14 can continue to control the HVAC system in its usual fashion via the switches 14c to maintain regional temperature at a user's temperature setting in a region R.

A bimetallic temperature control switch 28 is also carried by the housing 12 to provide a second backup operational mode. In response to a major power loss, for example, a drop in output voltage of the battery 32 substantially to zero volts, the bimetallic switch 28 functions to activate the HVAC system to provide a lower, backup level of heat to the region R without needing electrical energy from the local supply 32.

In summary, embodiments hereof can be developed into a connected thermostat that communicates via WiFi or Z-Wave transmissions and is 24 VAC or battery powered. Electronic control circuits, such as the circuits 14, can detect a low power mode, for example, if voltage of the battery 32 drops. In response to the detected drop, RF communication can be shut down or substantially reduced except for basic low battery status reporting to conserve power. The circuits 14 can continue to control the HVAC system to maintain a pre-set temperature in the region R.

If total power is lost and the electronic control circuits 14 are unable to maintain room temperature at its regular setpoint, a second backup system becomes operational. As the room temperature drops below a threshold setpoint, 40F, for example, the internal mechanical bimetallic thermal switch 28 will take over operating the HVAC system by a temperature based opening and closing of its thermal switch.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A thermostat comprising:
a wireless transmitter;
control circuits coupled to the wireless transmitter;
power sensing circuitry; and
a thermal sensor coupled to the control circuits,
wherein the control circuits respond to a pre-set temperature requirement to activate a selected output,
wherein the control circuits, responsive to sensing available power at a first level, reduce wireless communications through the wireless transmitter to a predetermined level, and
wherein the control circuits are deactivated in response to sensing the available power being at a second level lower than the first level so that the selected output is activated by a thermally responsive switch.

2. The thermostat as in claim 1 wherein the thermally responsive switch includes a bi-metallic temperature responsive electro-mechanical switch.

3. The thermostat as in claim 2 further comprising a power source coupled to the power sensing circuitry, wherein the selected output is configured to be coupled to a HVAC system.

4. The thermostat as in claim 2 further comprising a manually operable temperature specifying element coupled to the control circuits and a power source coupled to the power sensing circuitry.

5. The thermostat as in claim 1 wherein the power sensing circuitry responds to AC-type electrical energy or DC-type electrical energy.

6. The thermostat as in claim 5 wherein the control circuits send out, using the wireless transmitter, a low power indicating indicium when the available power is at or below the first level.

7. The thermostat as in claim 2 further comprising terminals for a battery configured to be coupled to a HVAC system.

8. The thermostat as in claim 7 further comprising a manually operable temperature specifying element coupled to the control circuits.

9. The thermostat as in claim 8 wherein the control circuits send out, using the wireless transmitter, a low power indicating indicium when the available power is at or below the first level.

10. The thermostat as in claim 9 wherein the control circuits respond to the pre-set temperature requirement to activate the selected output as long as the available power is above the second level.

11. A multi-mode thermostat comprising:
a sensor of ambient temperature;
control circuits coupled to the sensor, wherein the control circuits are responsive to first signals from the sensor to maintain a predetermined regional temperature;
electrically actuated first backup circuits that are responsive to a first operational power level to reduce a frequency of data transmission by the control circuits; and
mechanically actuated second backup circuits that are responsive to a second operational power level to maintain a backup regional temperature.

12. The multi-mode thermostat as in claim 11 wherein the first operational power level includes at least one of an AC-type power level or a DC-type power level.

13. The multi-mode thermostat as in claim 11 wherein the electrically actuated first backup circuits maintain the predetermined regional temperature.

14. The multi-mode thermostat as in claim 13 wherein the backup regional temperature is lower than the predetermined regional temperature.

15. The multi-mode thermostat as in claim 11 wherein the second operational power level corresponds to a complete loss of power.

16. The multi-mode thermostat as in claim 11 wherein the mechanically actuated second backup circuits include a thermal-mechanical switch.

17. The multi-mode thermostat as in claim 16 wherein the control circuits intermittently transmit status indicating signals, and in response to sensing the first operational power level, the electrically actuated first backup circuits reduce a rate of transmission of the status indicating signals.

18. A method comprising:
providing a sensor of ambient temperature;
control circuits of a thermostat receiving first signals from the sensor and, responsive to the first signals from the sensor, maintaining a first predetermined regional temperature;
the control circuits sensing a first operational power level of the thermostat;
the control circuits, responsive to sensing the first operational power level, reducing a rate of transmission of status signals; and
the control circuits, responsive to sensing a second operational power level, deactivating to terminate the transmission of the status signals.

19. The method as in claim 18 further comprising:
providing a thermal-mechanical switch; and
providing a second predetermined regional temperature lower than the first predetermined regional temperature in response to the second operational power level.

* * * * *